United States Patent [19]

Ross

[11] 3,991,320

[45] Nov. 9, 1976

[54] ELECTRIC BRANCH-LINE COMBINER

[76] Inventor: Frederick W. Ross, 755 Klamath Drive, Del Mar, Calif. 92014

[22] Filed: June 16, 1975

[21] Appl. No.: 587,205

[52] U.S. Cl. .................................. 307/71; 307/18; 307/147; 307/151
[51] Int. Cl.² ......................................... H02J 3/38
[58] Field of Search ............ 307/147, 127, 18, 140, 307/24, 149, 154, 151, 71, 42, 156

[56] References Cited
UNITED STATES PATENTS

| | | | |
|---|---|---|---|
| 3,509,356 | 4/1970 | Peebles | 307/42 |
| 3,582,669 | 6/1971 | Dempsey | 307/147 X |

Primary Examiner—R. N. Envall, Jr.

[57] ABSTRACT

Electric power, transmitted to a typical building by lead-in wires and distributed throughout the building by branch lines from which only a fraction of such power is available at each existing branch outlet, is recombined in an electric branch-line combiner which incorporates two or more electric input plugs, that fit into and receive power from two or more selected branch outlets, and contactor-selector means which relate voltage polarities and phases of the interconnected branch outlets and input plugs and channel the combined power transmitted through such two or more plugs into a single combiner outlet.

36 Claims, 10 Drawing Figures

ELECTRIC BRANCH-LINE COMBINER

BACKGROUND OF THE INVENTION

The power needed to operate electrical appliances such as television sets, refrigerators and other such devices as drills and impact hammers is obtained from branch outlets commonly available in existing buildings. The power usually enters the building from a two or three wire alternating current power line which divides into numerous branch lines terminating in electric fixtures and branch outlets. Typically such branch outlets deliver power in the form of alternating current at a voltage, usually between 110 and 120 volts, and are limited by fusing or otherwise to a prescribed maximum current, usually 15 amperes, which therefore limits the power to be drawn therefrom, to avoid overheating of branch lines and particularly of branch outlets.

To operate some devices, however, such as larger electric demolition hammers or air conditioners, substantially more power is needed, and to provide such power either greater voltage or greater amperage or both is required. While many existing buildings have one or more branch outlets powered at nominal 230 volts or have outlets limited to higher amperage, such higher-power branch outlets are usually either inconveniently located, or are relatively inaccessible. Accordingly, to use such higher powered devices, it is necessary either to install a higher power branch outlet, usually requiring considerable building change and expense, or to supply a portable gasoline-engine-driven electrical generator, which is expensive and creates much noise and smog.

Accordingly, there is an important need for a less expensive more convenient means for supplying higher power for such appliances, for example, from existing electrical building circuits. The present invention fulfills that need.

SUMMARY OF THE INVENTION

The invention comprises two or more electrical input connectors or plugs which fit into and receive electrical power simultaneously from selected branch outlets such as are commonly available in most existing buildings. Electric circuitry and contactor-selector means channel the power received by the two or more electric input plugs and combine it to be available from a single combiner outlet thereby making available in a single outlet two or more times the maximum power normally available from each separate branch outlet.

Such result is the reverse of that produced by dividing the power transmitted, for example, through a two-wire power line by branching as occurs in branched building circuits as described hereinbefore. In such branching, each branch conductor being connected separately to only one power line conductor, will inherently and always have substantially the same voltage, polarity, and phase of the power line conductor to which it is connected.

In contrast, to combine power from two or more branch outlets, for example, as found in typical existing buildings, the voltage polarity or phase of separate contactors of different branch outlets are not arranged or oriented in any particular way and hence are not readily identifiable.

With the contactor-selector means of the invention, the contactors of the two or more input connectors are identified, selected, and interconnected compatibly with the two or more contactors of the combiner output connector or outlet to prevent shorting of the building branch lines not otherwise compatibly interconnected, and to channel and combine the power from the separate input connectors into a single combiner outlet to make available power up to at least double the prescribed maximum available from each separate branch outlet at either twice nominal voltage and up to the maximum prescribed current or up to two or more times the maximum prescribed current.

Embodiments of the invention are disclosed with contactor-selector means comprising: symmetrical input connectors or plugs, with only a single conductor interconnection from each such input connector to a single combiner outlet, indexing means incorporating asymmetric plugs or particular structural arrangements; manually operated switches; and automatically actuated relays. Voltage sensitive means incorporated to identify voltages and phase differences include: voltmeters, voltage sensitive indicator lamps, and automatic relays. The invention can be arranged to provide double nominal voltage at from zero to maximum rated current, to provide from zero to more than double maximum rated current at nominal voltage, or to provide for either.

Other objects and advantages of the invention will become more apparent from consideration of the following detailed description and claims in conjunction with the accompanying drawings.

DETAILED DESCRIPTION OF THE INVENTION

Figure 1:
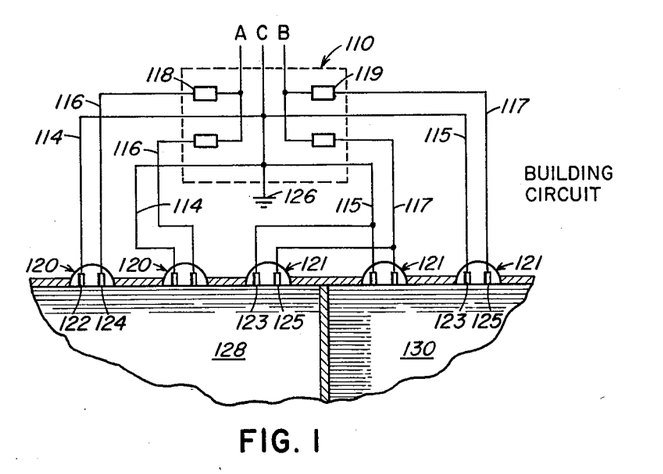
FIG. 1 is a diagrammatic somewhat fragmentary view showing typical features of an existing building electric circuit and its relation to two adjacent rooms of a typical building.

The relevant features of an existing electric circuit for supplying alternating current, for example, throughout a typical building are illustrated schematically in FIG. 1. Conductors A, B, and C are the usual power lead-in conductors interconnected to the building circuit from a typical electric power line. Usually the center conductor, C, is maintained substantially at zero voltage with respect to ground by a suitable ground connection indicated at 126. Conductors A and B each have an alternating voltage impressed thereon which is usually approximtely 115 volts, herein referred to as nominal 115 volts, with respect to zero or ground voltage on conductor C. Since the alternating voltage on conductor A has the same frequency as that on conductor B but is substantially 180° different in time phase, the root-mean-square or r.m.s. alternating voltage as referred to by those skilled in the art, between conductors A and B is substantially twice that between conductors A and C as well as twice that between conductors B and C. Such a three-conductor arrangement makes it possible to provide electric power at the more commonly used nominal 115 volts as well as at the higher nominal 230 volts.

The three lead-in conductors A, B, and C, enter a junction box 110 from which branch lines of two conductors each, some of which are branched further, extend to various points throughout the building. Some such branch lines terminate in branch outlets. To obtain the lower voltage, for example 115 nominal volts, which is required for most appliances, each branch outlet such as 120 or 121 (See FIG. 1) is electrically connected to such a branch line. Such branch outlets are commonly located in the walls of rooms as illustrated, somewhat diagrammatically by 128 and 130, in FIG. 1, each having two branch conductors 114 and 116, or 115 and 117, which terminate, for example, in paired branch contactors 122 and 124, and 123 and 125. In addition, such branch outlets, with at least two contactors each, are often grouped in pairs as commonly found in existing buildings.

Conductors 114 and 115 then as well as contactors 122 and 123 are connected to conductor C and hence are substantially grounded. Conductors 116 are connected through fusing means 118 to conductor A, and hence are maintained by the power line usually at nominal 115 volts relative to ground. Conductors 117 through fusing means 119 are connected to conductor B and hence are also maintained at nominal 115 volts relative to ground. In addition, because of the 180° time phase difference between conductors A and B, the instantaneous voltage therebetween is twice that between either conductor A or B and ground; and branch conductors 116 and 117 likewise have double such voltage or nominal 230 volts r.m.s. therebetween. Accordingly, as shown in FIG. 1, for example, branch contactors 124 and 125 of branch outlets 120 and 121 respectively, in the same or an adjacent room, also have such double voltage impressed therebetween. In FIG. 1 each branch outlet is shown having only two contactors. Other contactors, for example, a third not shown, may be included in the existing building circuit in each such branch outlet, which contactor may be ungrounded or grounded separately to a suitable ground as shown at 126 or by a conductor connected to conductor C.

Usually such branch lines terminate in fixtures and branch outlets distributed throughout the building with branch lines connected to conductor A usually being connected to branch outlets in the same or an adjacent room having branch outlets interconnected from conductor B, so the power transmitted through conductor A will tend to be equal to that transmitted through conductor B to avoid unnecessary overload of either conductor A or B.

Such branch outlets are usually restricted to a prescribed maximum current to be drawn therefrom, usually, but not necessarily 15 amperes, r.m.s. to avoid overheating in branch line conductors and especially in branch outlets. Each such branch outlet usually has at least two contactors, one connected to each conductor of the respective branch line. Each contactor may be male or female and is arranged to receive a matching input contactor of an input connector which is of the opposite type. Usually, but not necessarily, the contactors of branch outlets are female to avoid having open contactors, with high voltage impressed thereon, extending from the building wall, for example. Usually, but not necessarily, the left contactor, as viewed looking toward the outlet, is grounded as shown in FIG. 1. An "active" branch outlet is intended to mean "a branch outlet having at least two contactors, e.g. as shown in FIG. 1 with nominal voltage impressed therebetween and capable of delivering electric power from zero current up to a nominal or rated current, such as nominal 15 amperes as discussed hereinbefore."

To reduce repetition herein, and unless specifically stated otherwise: "connection" is intended to mean "electrical connection". Likewise: "conductor" means "electrical conductor"; "connected to" means "connected by electrical coductor to"; "outlet" means "output connector, either male or female"; "contactor" means "male, female, or a surface electrical contact means of any type"; "input connector" means "any connector suited for making electrical connection with any matching connector such as an outlet"; "plug" means "male input connector"; "receptacle" means "female outlet"; and, "fusing means" means "any means such as a fuse or other circuit breaker means for limiting current below a prescribed maximum".

Figure 2:
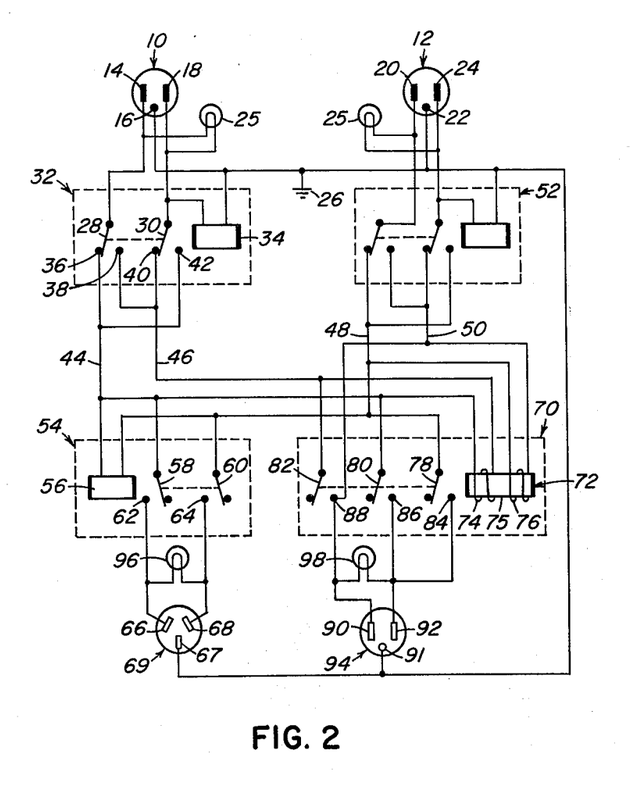
FIG. 2 illustrates schematically the electric circuit of an embodiment of the invention incorporating two input connectors and two combiner outlets with contactor-selector means incorporating four relays which automatically switch the connections to the contactors of the four input connectors to channel the input power, if at double voltage to one combiner outlet and, if at double amperage to a second combiner outlet.

FIG. 2 shows a presently preferred embodiment of the invention incorporating contactor-selector means in the form of automatically actuating relays and grounding means. Input connectors 10 and 12, which may be any commonly used 115 volt plugs, each shown as having three input contactors herein referred to as input contactors 14, 16, 18, and 20, 22, 24 respectively. Each input connector may be any type of connector with at least two contactors such as 14 and 18, or 20 and 24. The third input contactor, shown at 16 and 22 of each respective connector, is a grounding means not necessary for the invention, and for purposes of the invention may be replaced by a separate grounding means 26 as indicated in FIG. 2.

Input contactors 14 and 18 are connected to moving arm contactors 28 and 30 respectively of relay means 32, shown as having components within the dashed-line block. Relay 32 comprises actuator means 34, which may be any electrically energized actuator means such as an electromagnet with energizing coil connected between grounding means 26 and either input contactor, 14 or 18, and shown connected to input contactor 18. Relay means 32 further comprises a double-pole double-throw switch with pole contactors 36, 38, 40 and 42. Moving arm contactors 28 and 30 make contact with pole contactors 36 and 40 respectively when actuator 34 is non-energized, and to pole contactors 38 and 42 respectively when actuator 34 is energized. Pole contactor 36 is connected to pole contactor 42, and pole contactor 38 is connected to pole contactor 40. Output conductors 44 and 46 are connected to pole contactors 36 and 40 respectively.

With this arrangement, when input connector 10 is connected with a matching branch outlet, e.g. 120 of FIG. 1 for which one of the contactors is grounded as described hereinbefore, if, for example, input contactor 18 makes contact with such a grounded branch contactor, actuator 34 will be non-energized and the switch will remain in the switch "throw" or "position" shown in FIG. 2, and output conductor 46 will be substantially at ground voltage while output conductor 44 will be at substantially the voltage of input contactor 14 and of the contactor of the matching branch contactor with which input contactor 14 makes contact.

On the other hand, if the branch outlet contactor with which inlet contactor 14 makes contact is grounded, then contactor 18 will be at the nominal voltage and actuator 34 will be energized and switch the moving arm contacts 28 and 30 to pole contactors 38 and 42, thereby interchanging the interconnections between input contactors 14 and 18 and output conductors 44 and 46. As a result, output conductor 46 will be at substantially zero potential, and output conductor 44 at substantially the same voltage as input contactor 18. With the foregoing features input connector 10 can be inserted into any physically matching branch outlet without regard to which branch contactor is grounded and yet always have one conductor, such as conductor 46 substantially at ground voltage.

Similarly, input connector 12, relay 52 and the related circuitry connected as shown in FIG. 1, will always act to connect the circuitry with output conductor 50 at substantially ground voltage and output conductor 48 at the greater voltage regardless of which branch outlet is grounded. The aforedescribed group of circuit elements, including the double-pole double-throw switch and input conductors from e.g. input contactors 14 and 18, and the connections between pole contactors 38 and 40 respectively to output conductors 44 and 46, by which the connections between the two input conductors and the two output conductors can be interchanged as described hereinbefore, is referred to herein as "a two-conductor-interchange switching means." Conductors 44 and 46 are the output ends of conductor means which connect through the interchanging switching means to the respective input connectors.

It is noted that by changing the connection of actuator 34 to input contactor 14 instead of 18, and to 20 instead of 24, for example, output conductors 44 and 48 respectively will be the grounded conductors for the same reason as described hereinbefore for output conductors 46 and 50, and output conductors 46 and 50 will be the ungrounded output conductors. Furthermore, it is evident that the output conductor, such as 46, which, for the actuator non-energized, is connected through the switching means to the input contactor, such as 18, to which the actuator is electrically connected, is always the grounded output conductor. For example, with actuator 34 connected to contactor 14, instead of 18, output conductor 44, instead of 46, will be the output conductor always grounded. Accordingly, although the description hereinafter illustrates particular interconnections to relay means 54 and 70 of grounded output conductors 46 and 50, and of ungrounded output conductors 44 and 48, from each input connector 10 and 12 respectively, for other connections of actuator 34 to a different contactor of either input connector, the interconnections to relay means 54 and 70 are made to the grounded and ungrounded output conductors from the respective input connectors of which output conductors 46 and 50, and 44 and 48 respectively, as shown in FIG. 2, are representative.

Relay means 54, also indicated by the components shown in the dashed-line block, and as for all relay means described herein, which may or may not be shielded, has actuator 56 and a double-pole single-throw switch with moving arm contactors 58 and 60 and pole contactors 62 and 64 respectively. The two ungrounded conductors, shown as conductors 44 and 48 in FIG. 2, are connected to moving arm contactors 58 and 60 respectively, and pole contactors 62 and 64 are connected to output contactors 66 and 68 respectively, of combiner outlet 69. Actuator 56, which may be any electrically energized actuator means such as an electromagnet with energizing coil, is connected between the two ungrounded output conductors shown as 44 and 48 in FIG. 2.

When both input connectors 10 and 12 are connected into active branch outlets such as 120 of FIG. 2 which are powered from the same lead-in line (e.g. conductor A such as by conductors 114 and 116), then conductors 44 and 48 will be at substantially the same voltage and phase, and actuator 56 will not be energized and both poles of the switch will remain unconnected as positioned in FIG. 2.

When input connectors 10 and 12, for example, are inserted into branch outlets such as 120 and 121 (see FIG. 1) which receive power from branch lines interconnected to conductors A and B respectively, then substantially twice the normally expected voltage impressed between such branch contactors appears between output conductors 44 and 48. If the voltage impressed from conductor A and conductor B is alternating, and although with the circuitry as just described, what is referred to as the root-mean-square or r.m.s. voltage by those skilled in the art, will be substantially the same for output conductor 44 as for 48, the voltage on output conductor 44 will be substantially 180° different in time phase, from that in output conductor 48 so the r.m.s. voltage difference between output conductor 44 and 48 will be substantially double that between output conductor 44 and ground or between output conductor 48 and ground, for example. Under such conditions actuator 56, being selected to actuate only when substantially double such nominal voltage is impressed thereon, is energized and moving arm contactors 58 and 60 are moved, that is, the switch is "thrown" to the switch-closed position to connect output conductors 44 and 48 with pole contactors 62 and 64 respectively thereby impressing the double voltage across output contactors 66 and 68 respectively of combiner outlet 69.

Output conductors 44, 46, 48, and 50 are also interconnected to relay means 70 which comprises a triple-pole single-throw switch and actuator 72. Conductor 44 is connected to moving arm contactor 80. Similarly output conductors 46, 48, and 50 are connected to moving arm contactors 82 and 78, and pole contactor 88 respectively. Pole contactor 84 is connected to pole contactor 86 and output contactor 92 of combiner outlet 94. Actuator 72 is interconnected to output conductors 44, 46, 48 and 50 as follows: Actuator 72 has a differential energizer which may be any suitable differential type, and is here shown as being an electromagnetic energizer with two electrically separate actuator elements, here shown as energizing coils 74 and 76 with a common magnetic core 75, coils 74 and 76 having substantially the same electromagnetic characteristics. Coil 74 is connected between output conductors 44 and 46, and coil 76 is connected between output conductors 48 and 50. Both coils 74 and 76 are wound and connected to output conductors 44 and 46 as well as 48 and 50 respectively, as indicated in FIG. 2 so their contributions to the magnetic field in magnetic core 75 add when the voltage and phase on output conductors 44 and 48 are substantially equal. This energizes actuator 72 which throws switch moving arms 78, 80, and 82 to make contact with pole contactors 84, 86, and 88 respectively, thereby connecting output conductor 46 to output conductor 50 and output contactor 90 of combiner outlet 94, and output conductors 44 and 48 to output contactor 92 of combiner outlet 94. It is noted that when actuator 72 is thus activated, that is, when energizing coils 74 and 76 "cooperate" and relay 70 is switched, that relay 54 is not activated or switched, the voltage and time-phase of output conductors 44 and 48 being substantially the same. On the other hand, when the voltage between output conductors 44 and 48 is either double for a direct current-constant line voltge, or the time phase difference is 180° as for an alternating line voltage, then the magnetic effects of coils 74 and 76 oppose each other and actuator 72 will not be energized and the moving arms will remain in the position shown in FIG. 2 with the contacts open.

Input grounding contactors 16 and 22 and output grounding contactors 67 and 91 and the related interconnecting conductors are not essential to the circuit or its operation and may be omitted, in which case a separate grounding means must be provided as indicated at 26. Without the third grounding contactor the input connectors may be inserted into standardized branch outlets with no particular orientation of the input connector with respect to the branch outlet.

This embodiment is used, for example, in a home to obtain double power from two such branch outlets by drawing no more than the prescribed maximum current from either of two such branch outlets. If twice the nominal voltage, e.g. 230 volts a.c. is needed for a particular high powered appliance, inlet connector 10 is plugged into a convenient active branch outlet and input connector 12 into a nearby such branch outlet. Lamp 96, rated substantially for the double nominal voltage and connected across contactors 66 and 68, lights when substantially double nominal voltage is available from combiner outlet 69. It is observed that the connections to combiner outlet 69 are open unless such higher voltage is impressed thereon. While double voltage is present on combiner 69, all connections to low voltage combiner outlet 94 are open, except that to the grounded contactor 24 of input connector 12. If the double nominal voltage is not obtained and the lamp is in working condition, then one of the input connectors must be inserted in another such building branch outlet, using a suitable extension cord, if necessary, until a branch outlet connected to a branch line powered from the opposite lead-in conductor (A or B) is located and for which combination the lamp will light and the double voltage will be available on combiner outlet 69.

When input connectors 10 and 12 are inserted into two separate branch outlets which are interconnected to the same lead-in conductor, e.g. A, then lamp 98, connected between outlet contactors 90 and 92, lights and combiner outlet 94 is powered with nominal voltage, such as 115 volts, but with the capacity to deliver up to twice the rated current of each separate branch outlet. Additionally, lamps 25 may be connected across the contactors of each input connector to indicate that voltage is impressed between contactors when inserted into such branch outlets. These lamps aid in locating "compatible" branch outlets needed for double power output, either double voltage or double current, but are not essential to operation of the invention. For practical considerations, it is evident that the combiner outlets must be designed and constructed to handle safely twice as much power as either of the input connectors of the electric branch-line combiner or the branch outlets they are inserted into. Combiner outlet 69 must, in addition be rated to handle safely the double nominal voltage impressed thereon. Combiner outlet 69 as shown in FIG. 2, represents such a higher voltage higher power rated outlet.

It is evident that double rated current at nominal voltage can also be supplied through combiner outlet 94 by connecting input connectors 10 and 12 into branch outlets powered from a source having only two lead-in conductors rather than three as described hereinbefore.

Figure 3:
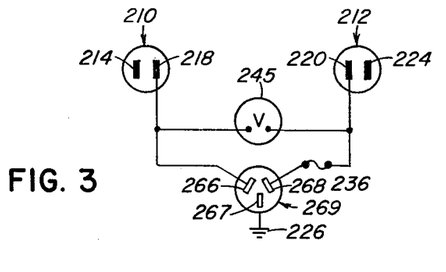
FIG. 3 illustrates an embodiment for transmitting double power at double normal voltage incorporating contactor-selector means having symmetrical input connectors and only one electrical connection from each input connector to one combiner outlet, and a voltmeter for indicating combiner outlet voltage.
Figure 4:
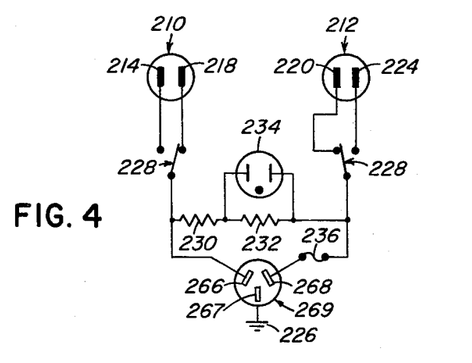
FIG. 4 illustrates a modified embodiment for providing double voltage with two single-pole double-throw manual switches for contactor-selector means and a neon lamp for voltage indication.
Figure 5:
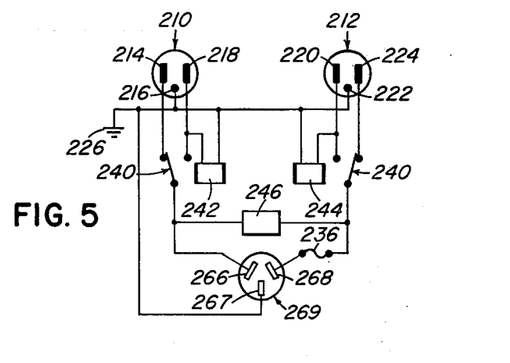
FIG. 5 illustrates an embodiment for providing double voltage incorporating two automatic single-pole double-throw switching relays for contactor-selector means.

FIGS. 3, 4, and 5 illustrate embodiments of the invention from which the power from two branch outlets can be combined only to obtain voltage twice that impressed on such separate branch outlets and up to rated current limitation. These embodiments deliver such double voltage when the respective input connectors 210 and 212 are inserted into selected branch outlets, of which one is electrically interconnected to lead-in conductor A of FIG. 1 and the other electrically interconnected to lead-in conductor B as discussed hereinbefore.

Otherwise, when input connectors 210 and 212 are interconnected through the respective contactors and conductors as discussed hereinbefore, to branch outlets electrically interconnected to the same lead-in conductors, i.e. either A or B but not across A and B, the voltage at combiner outlet 269 will be only nominal 115 volts, for example, and not double nominal, and the rated current will be limited to the maximum for each branch outlet.

Each of these embodiments of FIGS. 3, 4, and 5 has (1) two input connectors 210 and 212 electrically interconnected to one combiner outlet 269, which must be capable of handling such double power as discussed hereinbefore, (2) contactor-selector means for selecting and electrically connecting the input contactor (218 and 220 e.g.) of each input connector 210 and 212, respectively to the respective ungrounded contactor of the branch outlet into which the input connector is inserted, and (3) a single electric conductor means connecting only one such ungrounded contactor from each input connector to a different combiner outlet contactor, 266 or 268. With this circuit, when the two input connectors make connection with two branch outlets, and one is powered from conductor A and the other from conductor B, double nominal voltage will be impressed across combiner outlet contactors 266 and 268. Voltage sensitive means to distinguish zero, nominal or double nominal voltage is included as a convenience in locating the necessary active branch outlets as described hereinafter.

In the embodiment illustrated schematically in FIG. 3, the contactor-selector means incorporates no more than one single electric interconnection between each input connector 210 or 212, and the combiner outlet 269, and means for interchanging, such single connection to make contact with an active branch outlet connector. Such single connection is made to only one contactor on each input connector, such as 218 on input connector 210. Connection of such connected contactor with a matching outlet contactor which is active, such as 124 of FIG. 1, is insured by incorporating an input connector which can be inserted in the branch outlet to connect contactor 218, e.g. with either contactor 122 or 124 of branch outlet 120. Input contactor 218 only is connected to contactor 266 of combiner outlet 269, and input contactor 220 only is connected to contactor 268 of combiner outlet 269, no other connection of input contactor being necessary for this embodiment.

Only one contactor being needed on each input connector, then (1) a special input connector having only one contactor need be incorporated, (2) a non-conducting prong can be used to replace the unconnected contactor-pong, or (3) a commonly available symmetrical connector can be incorporated. "A symmetrical input connector" is intended to mean "an input connector having at least two contactors which can be connected into a branch outlet in either of two ways, e.g. an input connector such as 210 of FIG. 3 which can be connected into branch outlet 120 either (1) to connect contactor 214 to 122 and contactor 218 to 124, or (2) by a 180° rotation of input connector 210, to connect contactor 214 to 124 and contactor 218 to 122." With the incorporation of a typical symmetrical plug, an indicator lamp such as 25 of FIG. 2 can be incorporated.

Voltage sensitive means, in the form of voltmeter 245 is connected between combiner outlet contactors 266 and 268. Both grounding means 226 and fusing means 236, not essential for the invention, are practical elements normally incorporated in such circuits.

This embodiment is used by inserting each input connector 210 and 212 into a separate branch outlet. If voltmeter 245 indicates double voltage, then the circuit is ready for use of any appliance requiring such double voltage when plugged into combiner outlet 269. If less than double such voltage is indicated, then one of the input conectors is removed and rotated 180° and again pressed into the same outlet, thereby interchanging the contactors. Such rotating of input connectors and/or inserting of them into nearby outlets, powered from the same power source, is done until double voltage is obtained at the combiner outlet 269.

FIG. 4 illustrates a modification of the circuit of FIG. 3 wherein the contactor-selector means comprises a single-pole double-throw switch 228 incorporated in the connection from each input contactor of each input connector, 210 and 212. Each input connector has two contactors, e.g. 214 and 218, each connected to only one pole contactor of each switch. Thus, the input connector need not be removed and rotated as for the circuit of FIG. 3, this operation being accomplished by throwing, i.e. switching the switch, of one or the other, or both of the two switches 228. Otherwise this circuit operates as described for the embodiment of FIG. 3. Three prong connectors can be incorporated, and the third and grounding contactor 267 can be interconnected to a suitable grounding means such as indicated at 226.

FIG. 4 also illustrates an alternative voltage sensitive means comprising a gaseous discharge lamp, e.g. a relatively inexpensive neon gas lamp 234. Lamp 234 is connected across part of a voltage divider comprising two relatively high resistance resistors 230 and 232, connected in series across the combiner outlet contactors so that the lamp will light only for voltage substantially greater than that normally expected from the branch outlets into which the input contactors are inserted. The resistance of resistors 230 and 232 should be sufficient to draw only insignificant power from the circuit, yet low enough to light lamp 234. It is evident that a neon lamp rated for the full double voltage impressed between output contactors 266 and 268 can be incorporated equally as well and will not require resistors 230 and 232.

FIG. 5 diagrammatically illustrates a modification of the embodiment of FIG. 4, each switch of contactor-selector means being replaced by a switching relay 240. The switching portion of each relay is connected in the circuit in the same way as are switches 228 of FIG. 4. The actuator portion of the relays, actuators 242 and 244, are each connected between a suitable grounding means 226 and one of the input contactors, such as 218 and 220, on each of the respective input connectors 210 and 212. Relays 240 operate thus, for example: When input connector 210 is plugged into an active branch outlet, one of the input contactors, either 214 or 218 will be grounded as can be seen by reference to FIG. 1. For the embodiment of FIG. 5, then, if input connector 210 is plugged into a branch outlet to connect input contactor 218 with branch line conductor 114 or 115, then there will be no voltage impressed on actuator 242, and the switch will remain as shown. Therefore, output contactor 266 of the combiner outlet 269 will remain connected to the active input contactor 214 of the input connector 210. If the connections to the branch line are such that, when input connector 210 is plugged in, input contactor 218 has voltage impressed on it, substantially the same voltage will be impressed across actuor 242 and the relay will throw the switch and connect input contactor 218 to output contactor 266 instead. Similarly, the other relay with actuator 244 independently selects the input contactor 220 or 224 which is active (i.e. not grounded) and connects it to output contactor 268 of combiner outlet 269.

Voltage sensitive means to indicate presence of the double voltage between output contactors 266 and 268 may be a voltmeter or lamp as described hereinbefore.

The grounding means to which actuator 240 or 242 is connected may be obtained from a third grounded contactor on one or both input connectors as shown at 216 and 222 on FIG. 5; or, the circuit will function equally well by incorporating input connectors with only two contactors and any other suitable grounding means, such as a water pipe or other metal object buried adequately in the ground, and connected to actuators 240 and 242 as shown in FIG. 5 as well as to combiner outlet 267 of the combiner outlet 269.

Figure 6:
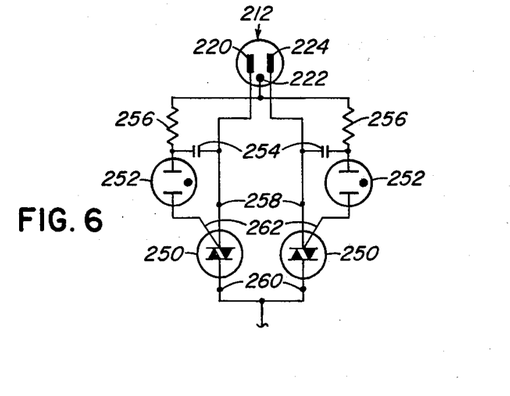
FIG. 6 illustrates a modified automatic switching embodiment incorporating two solid state triacs.

FIG. 6 illustrates diagrammatically an alternative automatic switching means incorporating what is referred to by those skilled in the art, as solid state triacs. Two such triacs incorporated as shown in FIG. 6 can be incorporated in place of each relay 240, for example, in the circuit of FIG. 5. Each triac 250 has two main leads, 258 and 260, and a gate lead 262. The main leads from each triac 250 are connected between contactors of input and output connectors as are switches 240 of the embodiment of FIG. 5. The gate leads 262 are each interconnected to grounding contactor 222 through neon lamp 252 and resistor 256. A capacitor 254 is connected between the conductor which connects lamp 252 to resistor 256 and to main lead 258. When input contactor 212 is pressed into an active branch outlet and voltage of substantially nominal value is impressed on input contactor 224, for example, such voltage will also be impressed upon capacitor 254. The latter being connected through resistance 256 to the grounded contactor 222 of input connector 212, for example, will have a charge induced thereon which will then impress a prescribed voltage on neon lamp 252, as adjusted by a selected resistance value for resistor 256 and capacitance for capacitor 254, and will trigger triac 240, that is, cause it to conduct and act as a closed switch. Meanwhile the companion triac will have no such voltage on its gate 262, input contactor 220 being grounded, so will not conduct. Neon lamp 252, capacitor 254, and resistance 256 as connected to gate 262 are referred to as a trigger means. Two such triacs interconnected as shown in FIG. 6 will provide the same function as each relay 240 when incorporated in FIG. 5 instead thereof.

Figure 7:
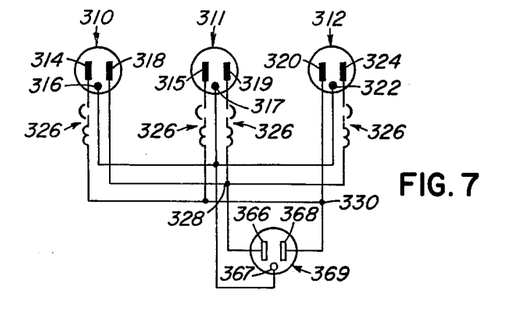
FIG. 7 illustrates an embodiment for tripling the current capability incorporating three input connectors with a contactor-selector means incorporating an asymmetric plug arrangement for indexing the contactors and fusing in each circuit from each plug.
Figure 8:
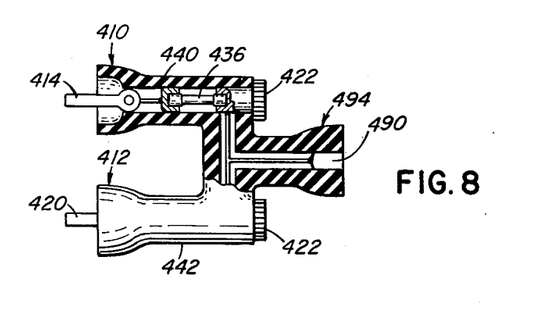
FIG. 8 is a somewhat diagrammatic sectional view of an embodiment with two input plugs with contactor-selector means incorporating a structural arrangement and partial rigidity to fit into paired branch outlets, and with fusing in the circuit connection to each input connector.
Figure 9:
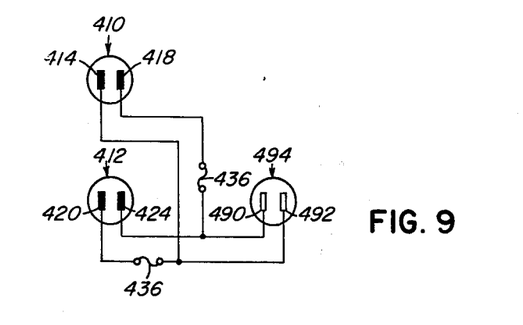
FIG. 9 is a schematic circuit diagram for the embodiment of FIG. 8.

FIGS. 7, 8, and 9 illustrate, diagrammatically, embodiments of the invention by which current from two or more branch outlets can be combined to be drawn safely and practically, from a single combiner outlet. As described hereinafter, such embodiments, from which up to double rated current of existing branch outlets can be drawn, all draw such current through only two lead-in conductors (i.e. A and C, or B and C), and accordingly, will function also from branch-outlets which branch from any existing two-conductor lead-in power source.

FIG. 7 illustrates one such circuit having three input contactors, 318, 319, and 324 of input connectors 310, 311, and 312 respectively, connected to junction 328, the connection to the latter two contactors through fusing means 326. Junction 328 is connected to output contactor 366 of combiner outlet 369.

Likewise each contactor 314, 315 and 320 of input connectors 310, 311, and 312 respectively, is connected to junction 330, the connections to the former two contactors through fusing means 326. Junction 330 is connected to output contactor 368 of combiner outlet 369. With this embodiment the contactor-selector means is in the form of an indexing means incorporating either a three prong (contactor) plug or input connector (as shown in FIG. 7), or a prong arrangement and matching branch outlet that can only be inserted in one orientation so that respective prongs of the plug will match socket contactors of matching voltage.

It is noted that at least one circuit breaker means is inserted in each interconnection between pairs of input contactors to open the respective interconnecting conductors if the system is overloaded as can occur if the input connectors are pressed into two source outlets powered from different lead-in conductors (A or B e.g.) as discussed hereinbefore, or if one of the branch outlets is inactive. For practical reasons and additional safety, it is preferable that circuit breaker means 326 be set to open at a lower current than the prescribed limit set for the branch outlets being used, e.g. 15 amperes for commonly available branch outlets. It is evident that this embodiment can be extended to have more than the three input connectors illustrated.

FIG. 8 and 9 illustrate somewhat diagrammatically and schematically a similar embodiment where the indexing means is structural and depends upon the number and arrangement of prongs or contactors of the plug and the branch outlet. This embodiment is intended to be utilized mainly for building branch outlets that are grouped, usually in pairs, but not limited to paired arrangements, as are commonly available in houses and buildings.

FIG. 8 is a somewhat diagrammatic partial cross sectional view through prongs 414 and 420 of such an embodiment where plugs 410 and 412 having commonly used prong arrangements, are geometrically located and arranged so that both "plugs" 410 and 412, can be inserted as a unit, into two of such paired branch outlets. The structure, especially of members 440 and 442, is formed of sufficiently flexible material such as rubber or plastic to have sufficient flexibility to permit movement for minor variations in the spacing of the grouped branch outlets, but enough rigidity so that the separate input connectors 414 and 420 cannot be inserted incorrectly. The electrical circuit of the embodiment of FIG. 8 is shown in FIG. 9 where contactors 414, 420 and 492 are connected together as are contactors 418, 424, and 490. Fusing means 436 are inserted in the conductors interconnecting each pair of input contactors as shown, for safety reasons, as stated hereinbefore.

In the two embodiments of FIGS. 7, 8, and 9 the circuits are simple, direct and will function only if the branch outlets into which the input connectors are plugged, have a common orientation of the grounded and active contactors as commonly installed in existing buildings. In particular, branch outlets are usually constructed as a physical and electrical unit having the contactors of each branch outlet oriented as shown schematically for the input plugs in FIG. 9, and with the branch outlet contactors into which inlet contactors 414 and 420, for example, make contact both structurally and electrically firmly fastened together.

It is evident when used as a means for combining current delivering capacity at substantially nominal voltage of the branch outlets, the electric branch-line combiners can be stacked by using, for example, the combiner outlet from two such combiners as branch outlets into which the input connectors of another such electric branch-line combiner of the invention can be inserted.

Figure 10:
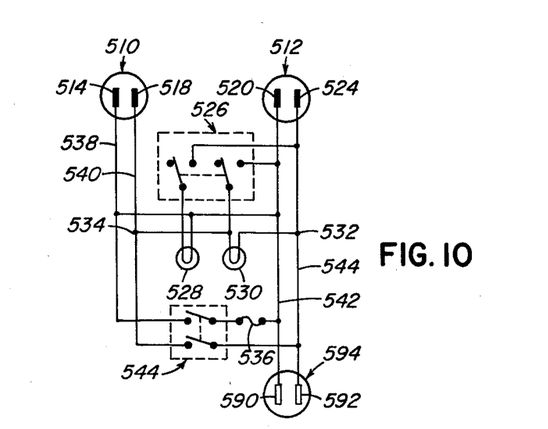
FIG. 10 illustrates an embodiment of the invention incorporating two input plugs each having two symmetrically arranged contactors and manual switching means and indicator lamps to aid switching operation.

FIG. 10 illustrates diagrammatically a modified embodiment of the invention for combining power by combining current from two branch outlets both powered from the same two lead-in conductors (A and C, or B and C), or, as described hereinbefore, from branch outlets both powered from any existing two-conductor power source. Contactor-selector means comprise conductor-interchanging means in the form of symmetrical input connectors described hereinbefore, a double-indicator lamp means, and a two-conductor on-off switch. Indicator lamps 528 and 530 are connected between conductors 538 and 542, and 540 and 544 respectively, these latter conductors each being connected to contactors 514, 520, 518, and 524 respectively.

Double-pole single-throw switch 526, which may preferably have a spring, not shown, to hold it in the open position as shown in FIG. 10, is closed by pressing the switch to the right, as shown in FIG. 10, to check proper functioning of lamps 528 and 530. Such check is made first, by connecting only input connector 512 in a branch outlet of suitable voltage, and closing switch 526. After opening switch 526, the other input connector 510 is inserted in another branch outlet. If neither lamp 528 nor 530 is lighted, then by closing switch 544, combiner outlet 594 is ready to provide current at nominal voltage up to twice the rated current of each separate branch outlet into which connected. If both lamps light, input connector 510, being symmetrical, is removed, rotated 180° and inserted again into the same outlet to interchange connections between contactors 514 and 518 of input connector 510 and the branch outlet into which input connector 510 had been plugged. For this orientation, lamps 528 and 530 will not light, thus indicating compatible voltages so that switch 544 can be closed as described hereinbefore. Further, if only one or the other lamp lights, then input connector 510 is inserted in another branch outlet as described hereinbefore. The lamps are selected to be capable of lighting without burn-out with double nominal voltage impressed thereon and to adequately indicate the nominal voltage as well. Neon lamps with or without a voltage divider such as described hereinbefore, or any other suitable indicator lamp may be used.

It will be evident to those skilled in the art that a two-conductor-interchange switching means as incorporated in the embodiment of FIG. 2, but manually switched without an actuator can be inserted between input connector 510 and the connection to lamps 528 and 530; and that a two-pole on-off switch can be electrically interconnected to open both connections to contactors 514 and 518 from other circuit elements, thus allowing input connector 510 to be inserted when checking lamps 528 and 530. Such an on-off switch can preferably be structurally arranged to be opened or closed simultaneously with closing or opening respectively, of switch 526 to simplify operation.

It will also be evident to those skilled in the art that one or more additional input connectors, such as 510, and related circuitry, including switches 526 and 544, and lamps 528 and 530 as connected to conductors 542 and 544, can similarly be connected thereto, to further increase the combined power which can be drawn from the combiner outlet. The latter would thereby be structured to handle such increased power.

The embodiment of FIG. 10 needs no grounding means to function. If grounding is preferred, input connector 512 and combiner outlet 594 can include a third grounding contactor with connecting conductor therebetween.

Combiner outlets 594, as well as 369 and 494, should preferably be structured and designed to adequately carry at least twice the rated current of the input connectors.

Fusing means 536 shown here as only one fuse in one conductor connected to switch 544 may, for extra protection include fusing means also in the other connected to switch 544, as is included in the similar circuit of FIG. 9.

In view of the embodiment of FIG. 10, it will be evident to those skilled in the art that the automatically operating relays of FIG. 2 can be replaced by switches operated manually and with voltage sensitive indicators connected in place of the respective actuators. In addition by incorporating symmetric input connectors for 10 and 12 of FIG. 2, eliminating switching means 32 and 52 and incorporating the double-indicator lamp means of FIG. 10 to output conductors 44, 46, 48 and 50, interconnecting the latter directly to input contactors 14, 18, 20, and 24 respectively, and eliminating the actuators 56 and 72, the embodiment of FIG. 2 can be operated manually.

Although the foregoing described embodiments for combining the output from branch outlets is described more specifically for connecting to typical existing building circuits supplied with a three-conductor system as shown in FIG. 1 and described hereinbefore, it will be evident to those skilled in the art that the principles of the invention will equally apply to any branched circuit whether from a direct current or alternating current source, or any other similar circuit or component thereof where two or more input lines supply electric power or send signals to branches of such input lines, as long as the power or signal strength transmitted from the branch lines substantially retain the voltage and polarity, if direct current, and time phase and frequency as well, if alternating current.

Having thus described the invention, the following is claimed:

1. An electric branch-line combiner comprising a combiner output connector, said electric branch-line combiner for combining at said combiner output connector power from two branch outlets of an existing multi-branched electric circuit powered from two nominal voltage lead-in conductors each having nominal voltage of opposite polarity impressed thereon and one substantially grounded lead-in conductor, and at least having one or more said branch outlets interconnected to each said nominal voltage lead-in conductor through a single fusing means, each said branch outlet having two branch outlet power-carrying contactors, said electric branch-line combiner further comprising:

a first and second electric input connector, each said first and second electric input connector having at least one combiner input power-carrying contactor structured to make electrical connection with one of said two branch outlet power-carrying contactors of a separate said branch outlet, said combiner output connector having a first and a second combiner output power-carrying contactor, electric power-carrying conductor means for electrically connecting each of said first and said second combiner output power-carrying contactors to only one of said at least one combiner input power-carrying contactor of one of said first and said second electric input connectors, and contactor-selector means embodied in the electric branch-line combiner for electrically interconnecting a selected one of said at least one combiner input power-carrying contactors of said first electric input connector with said first combiner output power-carrying contactor, and for electrically interconnecting a selected one of said at least one combiner input power-carrying contactors of said second electric input with said second combiner output power-carrying contactor.

2. An electric branch-line combiner as claimed in claim 1 wherein:
said contactor-selector means comprises said first and said second electrical input connectors formed to fit symmetrically any of said branch outlets of said existing multi-branched electric circuit and thereby make electrical contact between said at least one combiner input power-carrying contactor of each said first and second electric input connector with either power-carrying branch outlet contactor of each said branch outlet.

3. An electric branch-line combiner as claimed in claim 1 wherein:
each said first and second electric input connector comprises two combiner input power-carrying contactors,
said contactor-selector means comprises single-pole double-throw switching means electrically interconnected between said two combiner input power-carrying contactors of said first electric input connector and said first combiner output power-carrying contactor, said single-pole double-throw switching means for changing electrical connection of said first combiner output power-carrying contactor from connection with one of said two combiner input power-carrying contactors of said first electric input connector to the other of said two combiner input power-carrying contactors of the same said first electrical input connector.

4. An electric branch-line combiner as claimed in claim 3 further comprising:
a second single-pole double-throw switching means electrically connected between said second combiner output power-carrying contactor and said two combiner input power-carrying contactors of said second electric input connector to provide means for interchanging connections thereto.

5. The electric branch-line combiner as claimed in claim 1 wherein:
each said electric input connector has two combiner input power-carrying contactors,
said contactor-selector means comprises conductor interchanging means in the interconnection between each said two combiner input power-carrying contactors and one said first and second combiner output power-carrying contactors, said conductor interchanging means for matching contactors having compatible voltages as imposed thereon by said first and second electric input connectors when connected into compatible branch outlets.

6. The electric branch-line combiner as claimed in claim 5 wherein:
said contactor interchanging means comprises double-throw switching means having at least a single-pole contactor on each said double-throw, each said at least a single-pole contactor electrically connected to a separate one of said two combiner input power-carrying contactors of each said first and second electric input connector.

7. An electric branch-line combiner as claimed in claim 4 further comprising:
electric grounding means,
each said single-pole double-throw switching means comprises single-pole double-throw relay means comprising a single-pole double-throw switch and an electrically energized actuator interconnected by electric conductors between one of said two combiner input power-carrying contactors of said electric input connector to which said single-pole double-throw switching means is electrically connected and said electric grounding means.

8. An electric branch-line combiner as claimed in claim 7 wherein:
said electrically energized actuator comprises at least an electromagnetic energizing coil.

9. An electric branch-line combiner as claimed in claim 8 wherein:
each said first and second electric input connector and said combiner output connector has a third electric contactor, electric conductors interconnecting each said third electric contactor to said electric grounding means.

10. An electric branch-line combiner as claimed in claim 9 wherein:
said third contactors of each said electric input connectors match and fit a matching grounded contactor in said branch outlets.

11. An electric branch-line combiner as claimed in claim 3 further comprising:
electric grounding means,
each said single-pole double-throw switching means comprises a pair of solid state triacs, each said triac having gate means interconnected to said electric grounding means and to a different one of said two combiner input power-carrying contactors through an electric trigger means.

12. An electricl branch-line combiner as claimed in claim 1 wherein:
said electric conductor means connected to one said first and second combiner output power-carrying contactor comprises fusing means acting to open said connection to at least one of said first and second combiner output power-carrying contactors to prevent current overload in said conductor.

13. An electric branch-line combiner for combining two or more branch outlets of an existing multi-branched electric circuit having one or more branch lines, each branch line having branch-line fusing means and terminating in one or more said branch outlets, each said branch outlet having at least two active outlet contactors, said electric branch-line combiner comprising:
at least two electric input connectors, each having two input power-carrying contactors structured to make electrical connection with said at least two active outlet contactors of one of said two or more branch outlets,
at least one combiner output connector each having two combiner output power-carrying contactors,
a first electrical conductor means electrically interconnecting one of said two input power-carrying contactors of one of said at least two electric input connectors to one of said two input power-carrying contactors of each of the other of said at least two electric input connectors and to one of said two combiner output power-carrying contactors of said at least one combiner output connector,
a second electrical conductor means electrically interconnecting all the remaining power-carrying contactors of said at least two electric input connectors and said at least one combiner output connector together, at least one combiner fusing means in each interconnection between said input power-carrying contactors interconnected through said first electrical conductor means, said combiner fusing means set to interrupt the respective interconnection for currents less than the lowest rated current of the branch-line fusing means to which at least two electric input connectors are connected.

14. An electric branch-line combiner as claimed in claim 13 wherein:
said combiner fusing means comprises circuit breaker means.

15. An electric branch-line combiner claimed in claim 13 further comprising:
structure to support said at least two electric input connectors substantially in paired arrangement to match commonly available paired branch outlets.

16. An electric branch-line combiner as claimed in claim 1 wherein:
said contactor-selector means comprises voltage sensitive indicator means connected by electric conductors between said first and said second combiner output power-carrying contactors of said combiner output connector.

17. An electric branch-line combiner as claimed in claim 16 wherein:
said voltage sensitive indicator means has sensitivity to distinguish zero voltage, nominal voltage impressed between said two branch outlet power-carrying contactors of each said electric branch outlets powered from said lead-in conductors, and twice such nominal voltage.

18. An electric branch-line combiner as claimed in claim 1 wherein:
one said branch outlet is located remotely from another said branch outlet,
each said branch outlet having two power-carrying contactors having nominal voltage impressed therebetween from said existing multi-branched building electric circuit,
said contactor-selector means comprises voltage sensitive indicator means having sensitivity to distinguish zero voltage, such nominal voltage and twice such nominal voltage.

19. An electric branch-line combiner as claimed in claim 16 wherein:
said voltage sensitive indicator means comprises a voltmeter.

20. An electric branch-line combiner as claimed in claim 16 wherein:
said voltage sensitive indicator means comprises a comparatively high resistance voltage divider and an indicator lamp interconnected across part of said voltage divider, said voltage sensitive indicator means selected to light said lamp for voltage across said first and second combiner outlet power-carrying contactors above a prescribed voltage.

21. An electric branch-line combiner as claimed in claim 1 wherein:
said first and second electric input connectors have male contactors and said combiner output connector has female contactors.

22. An electric branch-line combiner as claimed in claim 1 wherein:

said combiner output connector is structured to have a voltage rating at least twice the voltage rating of said electric input connectors.

23. An electric branch-line combiner as claimed in claim 1 wherein:
each said first and second electrical input connector has at least two combiner input power-carrying contactors,
said contactor-selector means comprises at least one two-conductor-interchange means in the interconnection between each said combiner output power-carrying contactor and each respective electric input connector, a double-pole single-throw relay actuated by double such nominal voltage impressed from both said two-conductor-interchange means, and a differential relay actuated cooperatively by compatible voltages impressed from both said two-conductor-interchange means.

24. An electric branch-line combiner as claimed in claim 13 further comprising:
at least one voltage indicator electrically connected between each pair of power-carrying contactors, each said pair of power-carrying contactors comprising one contactor of one said at least two electric input connectors and another power-carrying contactor of another said at least two electric input connectors, said voltage indicator to indicate substantial voltage between said pairs of combiner input power-carrying contactors.

25. An electric branch-line combiner as claimed in claim 24 further comprising:
a two-pole one-position switching means in the electrical connection between each said pair of power-carrying contactors for closing and opening such electrical connectors between said pairs of power-carrying contactors.

26. An electric branch-line combiner as claimed in claim 24 further comprising:
a two-pole on-off switching means electrically connected in the electrical connection between each said pair of power-carrying contactors to check correct functioning of said voltage indicator for said switch in said on position.

27. An electric branch-line combiner as claimed in claim 23 further including:
a second combiner output connector having two power-carrying contactors interconnected to said differential relay and having impressed therebetween, such nominal voltage by actuation of said differential relay by such compatible voltages.

28. An electric branch-line combiner comprising:
two electric input connectors each having two combiner input power-carrying contactors structured to fit into and make electrical connection simultaneously with two active branch outlets of an existing electric circuit,
two two-pole two-position switching means,
two electric conductor means each having two output ends and connected through each said switching means to one of said two electric input connectors, said switching means and said electrical conductor means for switching to a switch position whereby one of said two output ends of one of said two electric conductor means is always at substantially the same voltage as another of said output ends of the other said two electric conductor means.

29. An electric branch-line combiner as claimed in claim 28 further comprising:
electric grounding means,
each said two-pole two-position switching means further comprising an electric relay means, each having an electric actuator connected between said electric grounding means and one of said combiner input power-carrying contactors of each said electric input connector, said electric relay means for automatically switching said two-pole two-position switching means to a switch position whereby one of said output ends of said two electric conductor means is always grounded, the other said output end of said two electric conductor means being an electrically ungrounded output end.

30. An electric branch-line combiner as claimed in claim 29 further comprising:
a first combiner output connector comprising at least two combiner output power-carrying contactors,
a third relay means comprising a two-pole single-throw switching relay means having an electric actuator means connected between said electrically ungrounded output ends of each said two electric conductor means, said electric actuator being energized by substantial difference in voltage and time phase between said electrically ungrounded output ends of each said two electric conductor means, said actuator to close said switch and interconnect one said electrically ungrounded output end to one of said combiner output power-carrying contactors and the other said electrically ungrounded output end to the other said combiner output power-carrying contactors.

31. An electric branch-line combiner as claimed in claim 30 further comprising:
a voltage indicator having two contactors,
a fourth relay means comprising a three-pole single-throw switching relay means connected between said output ends of each said two electrical conductor means and said voltage indicator means and comprising a differential electric actuator having two separate electric actuator elements, one said actuator element being connected across each pair of said output ends of each said electric conductor means, said separate actuator elements to cooperate in actuating said switching relay means only with a substantially equal voltage and time phase impressed between said output ends of both said two electric conductor means.

32. An electric branch-line combiner as claimed in claim 30 further comprising:
a second combiner output connector comprising at least two combiner output contactors,
a fourth relay means comprising a three-pole single-throw switching relay means connected between said output ends of each said electrical conductor means and said second combiner output connector through fusing means and comprising a differential electric actuator having two separate electric actuator elements, one said actuator element being connected across each pair of said output ends of each said electric conductor means, said separate actuator elements to cooperate in actuating said switching relay means only with a substantially equal voltage and time phase impressed between said output ends of both said electric conductor means.

33. An electric branch-line combiner as claimed in claim 32 wherein:
said contactor-selector means further comprises at least one voltage indicator electrically connected between said two combiner input power-carrying contactors of each said two electric input connectors, said voltage indicator to indicate substantial voltage difference between said two combiner input power-carrying contactors.

34. An electric branch-line combiner as claimed in claim 32 further comprising:
a double-nominal voltage indicator electrically connected between said first and said second combiner output power-carrying contactors of said first combiner output connector 35. An electric branch-line combiner as claimed in claim 32 wherein:
said contactor-selector means further comprises a a nominal-voltage indicator electrically connected between said first and said second combiner output power-carrying contactors of said second combiner output connector.

36. An electric branch-line combiner for electrically interconnecting a single combiner power outlet across two high voltage branch outlet contactors of an existing multi-branched electric circuit powered from three lead-in conductors, said three lead-in conductors including two oppositely phased high voltage lead-in conductors each having impressed thereon high voltage of opposite phase or polarity from the other, and a third neutral or grounded conductor, the existing multi-branched electric circuit having two or more branch outlets each having only one high voltage contactor, all such high voltage contactors connected through one or more fusing means to one or the other of the two oppositely phased high voltage lead-in conductors, each said branch outlet having at least a second outlet contactor interconnected to the third neutral or grounded lead-in conductor, said electric branch-line combiner comprising:
two electric inlet connectors, each having at least one electric input contactor, said combiner power outlet comprising no more than two ungrounded combiner outlet contactors,
contactor-selector means embodied in the electric branch-line combiner for electrically interconnecting one of said no more than two ungrounded combiner outlet contactors to no more than one of said at least one electric input contactor of one of said two electric input connectors and for electrically interconnecting the other of said no more than two ungrounded combiner outlet contactors to no more than one of said at least one electric input contactors of the other of said two electric input connectors,
the interconnection of only one said no more than two ungrounded combiner outlet contactors to no more than one said at least one electric input contactors of each of said two electric inlet conductors in combination with said contactor-selector means thereby being positive means for selecting an interconnecting said high voltage contactors for providing double power at said single combiner power outlet from said two oppositely phased high voltage power lead-in conductors without information on the interconnections of the branch outlets to the lead-in conductors.

* * * * *